United States Patent [19]

Bohm et al.

[11] Patent Number: 5,404,507
[45] Date of Patent: Apr. 4, 1995

[54] APPARATUS AND METHOD FOR FINDING RECORDS IN A DATABASE BY FORMULATING A QUERY USING EQUIVALENT TERMS WHICH CORRESPOND TO TERMS IN THE INPUT QUERY

[75] Inventors: Charles P. Bohm, Westwood; David A. Nowitz, Woodbridge; Jeffrey J. Simon, New Providence, all of N.J.

[73] Assignee: AT&T Corp., Murray Hill, N.J.

[21] Appl. No.: 844,045

[22] Filed: Mar. 2, 1992

[51] Int. Cl.⁶ .............................................. G06F 15/40
[52] U.S. Cl. .............................. 395/600; 364/DIG. 1; 364/282.1
[58] Field of Search ................... 395/600; 364/419.07, 364/419.13, 419.14, 419.15, 419.19

[56] References Cited

U.S. PATENT DOCUMENTS

| 4,823,306 | 4/1989 | Barbic et al. | 395/600 |
| 5,062,074 | 10/1991 | Kleinberger | 395/600 |
| 5,091,852 | 2/1992 | Tsuchida et al. | 395/600 |
| 5,168,565 | 12/1992 | Morita | 395/600 |
| 5,278,980 | 1/1994 | Pedersen et al. | 395/600 |

*Primary Examiner*—Thomas G. Black
*Assistant Examiner*—John C. Loomis
*Attorney, Agent, or Firm*—Samuel R. Williamson

[57] ABSTRACT

An apparatus and method for searching for records of database items with incomplete or incorrectly provided input data. Database queries are automatically created and executed in a manner that has a high probability of selecting the correct record indicative of a desired item from a retrieved set of candidates. The queries comprise search expressions which are generated for supplementing each one of a series of input words comprising the input data. These search expressions include terms and phrases that are equivalent to each input word and also include expanded acronyms and abbreviations. When required, the search expressions further include words that are close to an input word when it appears to be misspelled.

28 Claims, 3 Drawing Sheets

APPARATUS AND METHOD FOR FINDING RECORDS IN A DATABASE BY FORMULATING A QUERY USING EQUIVALENT TERMS WHICH CORRESPOND TO TERMS IN THE INPUT QUERY

BACKGROUND OF THE INVENTION

1. Technical Field

This invention relates to data retrieval techniques and more particularly, to an apparatus and method for retrieving a data record of an item or object in a database with limited or incomplete input data.

2. Description of the Prior Art

Service and product providers, when responding to customer requests, are required to locate specific records in databases which identify an item or object sought by a customer. Often the information provided by the customer is not complete or partially incorrect, however. One such example of an operation wherein a customer provides information for requesting a specific item is that provided by a mail order information center. The customer may, for example, electronically submit an order for a specific book for which he or she has only partial information and the information center then has to locate the specific record of this book in its database before it can fill the order. Orders are most often entered by customers using a request program that is available on thousands of computers. There is no validation for these requests but the information provided by the customers is entered in identified fields, such as title, author and the like. This information may consist of, singularly or in combination, arbitrary abbreviations, acronyms and even incorrect or misspelled words.

Thus the task for the service or product provider is to find the item or object with the given information. This type of database searching is most often done by operators who are familiar with the items or objects, the databases and also know how to resolve errors in the input data provided by the customers. Using known information retrieval techniques, a skilled operator can search the databases and mind the searches based on results obtained along the way. While this type of database searching has been found satisfactory where there are ample, available skilled operators, nevertheless, in order to be cost effective and still assure uniformity of results, it is desirable to automate the process of finding specific records of items or objects in databases.

SUMMARY OF THE INVENTION

In accordance with the invention, an database interrogation system is arranged for automatically creating database queries that have a high probability of finding the correct record of an item or object in an information database with limited or incomplete search information as input data. The input data typically comprises an input string of target words and the query is created by examining each one of the target words in the string.

In accordance with one aspect of the invention, when requests are input into the system, the target words are examined and a set of search expressions is created from a search expression database. This database contains words, abbreviations, and acronyms equivalent to words in an identified field of the information database for items to be searched. By creating the set of search expressions, the database interrogation system supplements each term used by the customer with additional terms and phrases that provide an equivalent representation of the term from the original request for increasing the likelihood of retrieving the correct record of the corresponding information database item. Once the set of search expressions is created, the search expressions are combined in ordered queries and executed in the assigned order against the information database. The records of items retrieved from the information database through the queries are evaluated in accordance with a predetermined parameter and the record of the item best fitting the original input string of target words is selected as the correct record.

In accordance with another aspect of the invention, when one of the target words input into the system is examined and cannot be found in the search expression database, a second database is examined to generate a search expression of words from the information database. This search expression represents probable alternative words that are close to the given target word which is most likely misspelled. The use of these alternative words increases the likelihood of retrieving the correct record of the corresponding database item. Once these search expressions are created, they are combined with the other existing search expressions in ordered queries and executed in the assigned order against the information database. The records of items retrieved from the information database through these queries are evaluated and the record of the item best fitting the original input string of target words is selected as the correct record.

BRIEF DESCRIPTION OF THE DRAWING

This invention and its mode of operation will be more clearly understood from the following detailed description when read with the appended drawing in which.

DETAILED DESCRIPTION

Figure 1:
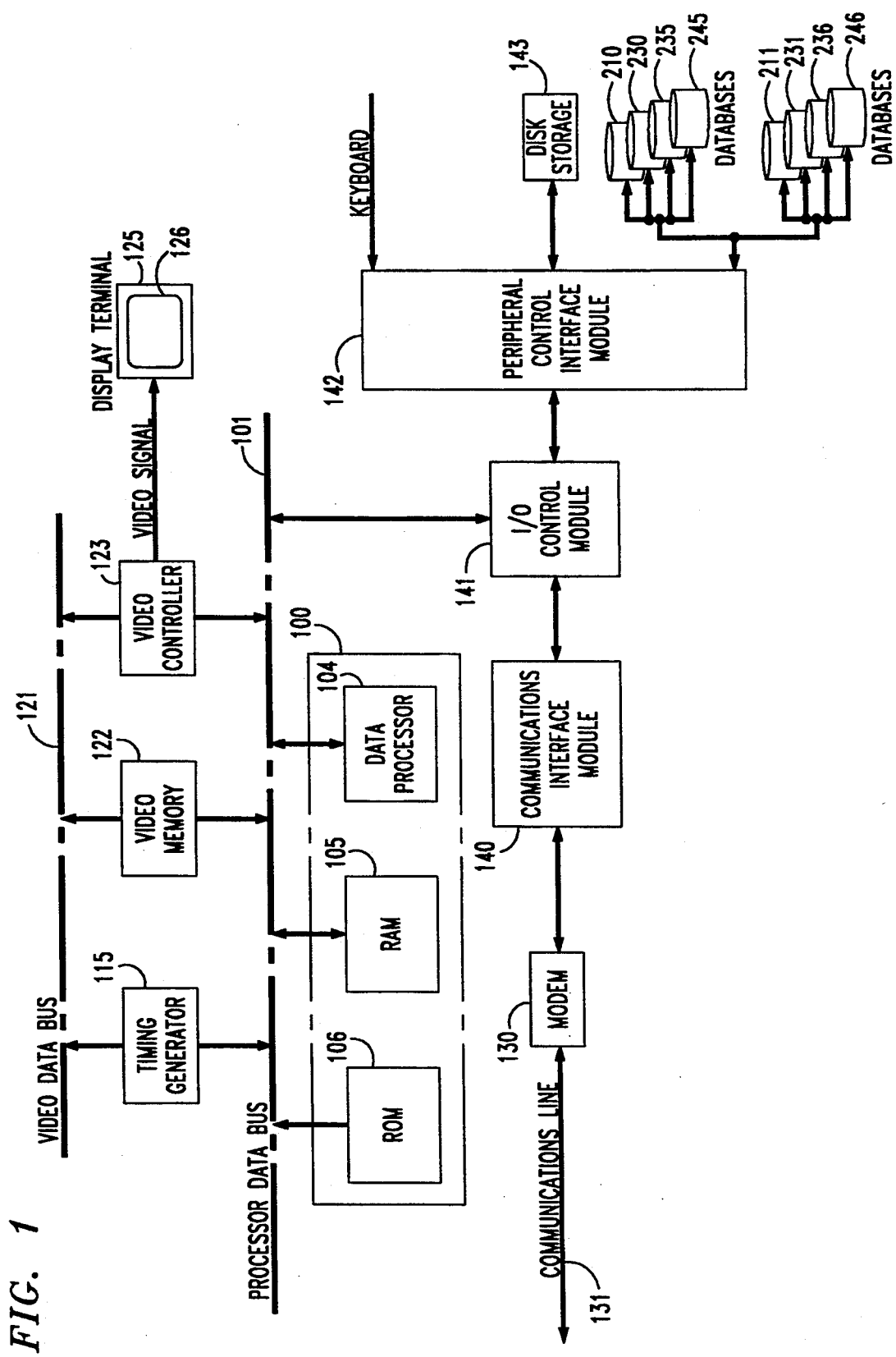
FIG. 1 is a block diagram of an information display system for interrogating an information database in accordance with the invention.

Referring now to FIG. 1 of the drawing, there is shown a general block diagram of an information display system employing the principles of the present invention. This information display system may be in an information center or library, for example, and is usually located remotely with respect to computers from which it receives customer provided information. The elements employed in the information display system are computer 100, timing generator 115, video memory 122, video controller 123, video display terminal 125, with a display screen 126, modem 130, and control interface modules 140, 141, and 142.

The customer provided input to the system is provided over a two-way communications line 131 to the modem 130. When a customer decides to order an item or object from the information center, inquiry commands from the computer 100 are provided. These commands prompt the customer to enter the requested information in identified fields such as title and/or author when, for example, the item sought is a book. These inquiry commands from the computer 100 are sent to a remote computer or terminal (not shown) over the communication line 131 and the requested information is similarly returned over this line to the communications modem 130. The communications modem 130 and communications line 131 also are used by the system for automatically communicating an order request to an appropriate provider after the record of an item or object has been found in a database query, described in detail later herein.

The customer provided information is coupled to the communications interface module 140 for input to the computer 100 or for input to a temporary disk storage medium 143, via the control modules 141 and 142, for later retrieval by a system user performing a database search for a record representative of an item stored on one or more of the databases interfaced to the system.

The peripheral control module 142 interfaces the computer 100 to the appropriate ones of a series of databases, or data files, illustratively shown as databases 210, 211, 230, 231, 235, 236, 245 and 246, in accordance with the service or task being performed. It is to be understood that other databases providing additional services or tasks also may be simultaneously interfaced with the computer 100. The peripheral control module 142 also couples user provided input from a keyboard accessible by the system user to the computer 100. Input/output (I/O) controller module 141 provides a data link between modules 140 and 142 and the processor data bus 101 which connects to the computer 100.

Contained in the computer 100 are a data processor 104, random access memory (RAM) 105 and read only memory (ROM) 106. This processor 104 responds to data input into input/output control module 141. And with input from random access memory 105 and read only memory 106, processor 104 also provides the data to the processor bus 101 for loading the video memory 122.

Connected to the video memory 122 via a video data bus 121 is the video controller 123. This controller accepts information from the video memory 122 and provides it in a form suitable for displaying on the display screen 126 of video display terminal 125. The timing for the elements supplying signals to the video data buss 121 and the processor data buss 101 are provided by timing generator 115.

Figure 2:
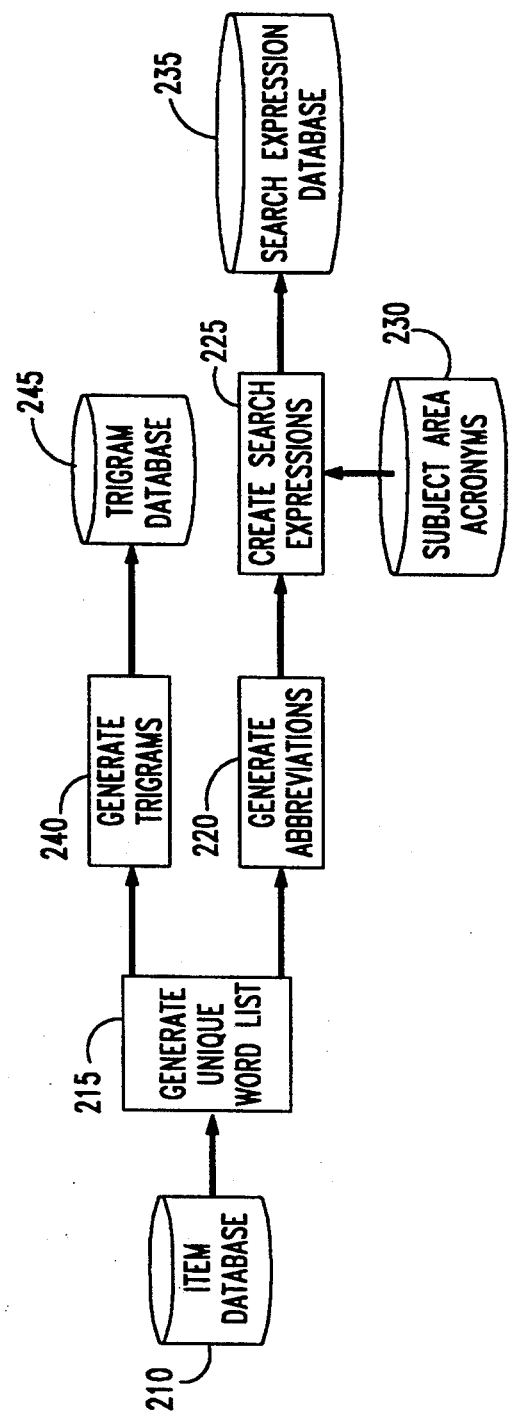
FIG. 2 is a flow chart depicting the process used in creating a set of databases of terms for obtaining search expressions, in accordance with the invention.

With reference to FIG. 2, there is shown a flow chart depicting the process used in creating a set of databases of terms for obtaining search expressions. These search expressions are generated for supplementing each target word originally used by the customer and, in a first search configuration, comprise terms and phrases that contain the equivalent representation of the intended term derived from the original target word. Through the addition of these terms and phrases, the likelihood of retrieving the correct record for a particular item is considerably increased. In accordance with the invention, these search expressions include expanded acronyms and abbreviations and also, when required, an expression that represents words that are close to the target word when it appears to be misspelled.

An information or item database 210 is created for each of a plurality of customer input fields, such as book title or author name in the case of a book or journal, by taking all the data in each of the fields that will be used for identification from the item database. In the process of building the search expression and trigram databases, by way of example, a list of all the words in the journal titles, a list of all of the words in the book titles, and/or a list of all the author last names of the books is extracted from the item database.

Each item database is used to generate search expressions for an associated customer input field. Thus the author search expression database is used to find search expressions for author names given by the customer and the book title search expression database is used to find book titles given by the customer. The fields that are used for retrieving items from the item database are extracted to generate one or more unique word lists in step 215.

More than one item database may be used in the search for a record of an item, in accordance with the invention. In the case of a search for the record representing a title of a conference proceeding, for example, an item database created for books is searched and if the record having the desired title is not found, then a journal titles database, for example, is also searched for the record having the desired title. (Some conference proceedings are published as monographs, and will appear in a books database, while other conference proceedings are published as journals and will therefore appear in a journals database.) The system may be arranged so that a given number of multiple databases may be searched for a record representative of a particular item.

The words contained in the unique word list generated at step 215 are used as input to algorithms for generating search keys (words and abbreviations) and search expressions from these words at step 225. Abbreviations are generated in step 220 and illustratively includes, without limitation, the following:
 the first three letters of the word
 the first four letters of the word
 the first letter and the next two consonants
 the first letter and the next two consonants and the last consonant By way of example, the word computer, may be abbreviated com, comp, cmp, cmptr, or cmpr. And the word commercial, may be abbreviated cmmr, commerc comm, cmmcl, cmcl com, commer. By sorting these target words by their abbreviations, and then combining the terms corresponding to each abbreviation, a search expression is created in step 225 that consists of a series of or terms that contain the possible words that the abbreviation can represent. Therefore, from the above example, the term com would have a search expression of
 (computer or commercial)

In addition to the target words obtained from the items database 210 and indexed for generating search expressions, a database 230 of subject area acronyms also may be used in generating the search expressions in step 225. For example, the search expression for ATT in the database 230 may be defined as
 (ATT or AT&T or (american and telephone and telegraph))

All searching is done without regard to case and all letters are treated as lower case.

In the create search expressions step 225, the search expression for the search key (ATT in this example) is combined with other search expressions for the same key. The resulting search expression may appear as
 (ATT or AT&T or (american and telephone and telegraph) or att or (attention or attachment)).

Other words also could have att as their abbreviation. They would similarly appear as part of the search expression.

Each record in the search expression database 235 will have: 1) a word that might be found in a request from a system user (the database search key); and 2) a search expression that represents alternatives that the search key (a word that may be input by a customer) could represent. For example, the word j may have a search expression (j or journal)

The search keys and search expressions created in step 225 for the particular input field are stored in a search expression database 235. Search expression databases may exist for titles, authors and any other specific fields that are selected for examination.

The words contained in the unique word list generated at step 215 are used as input to an algorithm for generating a database that will be used to try to correct misspelled words (trigram database 245). One of these databases is associated with each customer input field used to find the requested item. All the trigrams (sets of three consecutive characters) of each unique word of at least four characters are generated in step 245 and indexed (with its associated unique word). In addition to indexing the trigram field, each of the first and last trigrams of each word are indexed with its associated unique word as separate indexed fields. For short words, the first and last digram (consecutive 2 characters) are also indexed. For very short words, the first letter is also indexed with its associated unique word.

A record in the trigram database contains the unique word and the following fields, each of which is indexed for searching: all the trigrams, the first trigram, the last trigram, the first digram (when applicable), the last digram (when applicable), the first letter (when applicable). The record key (a number used to order the records in the database) is generated in such a way as to include information about the length of the unique word. The search algorithm permits the restriction of the search by record key range, thus the search against this database is set for records whose words are close in length to the misspelled word in question.

All words that contain at least four characters in the unique word list are broken into trigrams. Thus, by way of example, the word computer will generate the trigrams com omp mpu put ute ter For short words, additional grams are used:
for words less than eight characters, the first and last digrams are generated and indexed
for words less than six characters, the first letter is indexed This additional information provided for short words is beneficial since in such words, one incorrect letter could make both the first and last trigrams incorrect. If trigrams were employed in these short words, when the system looks for the set of candidates, the correct word might not be included in the candidate list. The only candidates retrieved through this process are those whose length is close to the length of the misspelled word in the request.

As indicated previously herein, when a target word cannot be found in the search expression database 235, the word is assumed to be misspelled. As a result, the process generates a search expression from the trigram database 245 with probable alternatives to misspelled target words input by the customer. Through use of this search expression, the likelihood of retrieving the correct record for a particular item is considerably increased.

To retrieve candidate words from the trigram database, a search is generated as follows:

(first-trigram or last-trigram) and (second-trigram or third-trigram or ... )

For short words the first digram, last digram and first letter are used in combinations depending on the word length. The candidate words are evaluated by seeing how many character changes (replace, insert, or delete) are needed to match the candidate word to the misspelled word. The search expression is created by using the candidates that are within some specified limit of closeness as described with reference to FIG. 3. (The acceptable closeness value may vary by the field being considered.)

Figure 3:
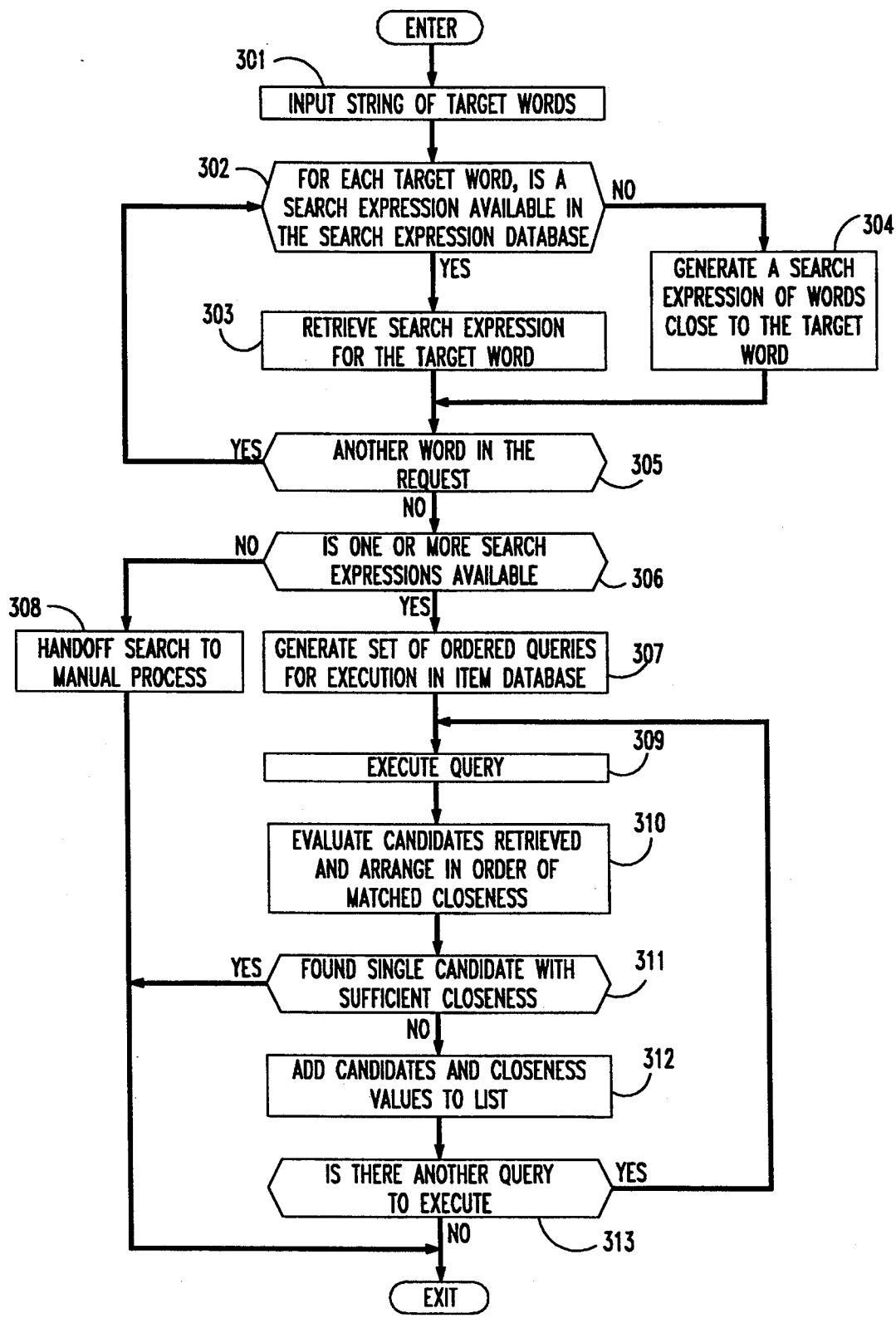
FIG. 3 shows a flow chart illustrating the operation of the information display system of FIG. 1 in creating and executing database queries in accordance with the invention.

Referring next to FIG. 3, there is shown a flow chart illustrating the operation of the information display system of FIG. 1 when configured for performing database queries. This system creates and executes database queries that have a high probability of finding the correct record for an item or object in a database with limited or incomplete search information being provided as input data. The functions provided by data processor 104 are advantageously determined by a process or program stored in ROM memory 106, these components being shown in and previously described with reference to FIG. 1.

The process is entered at step 301 where an input string of target words, representing a received customer request, is entered into the system for comparison. Each word in the input string of target words is checked against the known words (search keys) for the particular input field in the search expression database in step 302.

If at decision 302, a search expression is available for the input target word, the search expression retrieved at step 303 is saved for use in step 306 and step 307. If, however, a target word cannot be found in the search expression database, the target word is assumed to be misspelled and the process advances to step 304. At step 304, the process, using the trigram database, generates a search expression of words that are close to the target word for use in step 306 and step 307. The target word is also included in the search term in case the search expression database does not contain the complete set of words. This may happen if, for example, the item database gets updated frequently with new records of items that are not similarly updated in the search expression database.

Using both step 303 and step 304, each word in the input string of target words is examined and a search expression is either retrieved from the search expression database or generated using the trigram database. From both steps 303 and 304, the process advances to decision 305 where the input string of target words is examined for additional words. If there is a word in the request that has not been examined, the process returns to step 302. If all of the words in the request have been examined, the process advances to decision 306.

At decision 306, a decision is made as to whether one or more search expressions are available. If no search expressions were obtained, the process advances to step 308 and the search is handed-off to a manual process. From step 308, the process is exited. If, however, one or more search expressions is obtained at this decision 306, the process advances to step 307. At this step 307, a set of ordered queries is created. These ordered queries comprise the search expressions combined in queries in order of most restrictive to least restrictive, for advantageously retrieving the fewest number of candidates from the item database.

Each query is made as inclusive as possible to try to retrieve the desired candidate (high recall). At the same time, as many search expressions as possible are used to effectively narrow the list of candidates (high precision).

From step 307, the process advances to step 309 where the queries are executed in the order of most restrictive to least restrictive. Thus the query containing the most search expressions is executed first. If no candidates are found during the execution of the first one of the ordered queries, the next query in the order is executed, until one or more candidates is retrieved.

As each query is executed, the results are handed to step 310 for evaluation. If a single candidate is retrieved with a high enough closeness value (step 311), the process is exited and the system automatically generates a request for the desired item, such as, in the case of a book, an order directly to the appropriate publisher. If a single candidate is not retrieved with a high enough closeness value, the candidates values are saved in a list in step 312 and a determination is made in step 313 as to there being another query to execute. If no queries are left to execute, the process is exited and the results of the candidates are reported. If additional queries remain unexecuted, the process returns to step 309 where the next one of these queries is executed.

Each search is done against one or more databases, in accordance with the invention. For example, a request for a conference proceeding is run against a book titles database, as well as against a journals titles database because one can find conference proceedings in both databases. (Some conferences are published as journals while other are published as monographs.)

Criteria such as exact word matching, ordered word prefix matching, and number of matched words/prefixes are used to assign an indicator for a closeness value to each candidate in step 310.

For example, given the request for

C prog. lang the initial search might retrieve the following titles:

C notes: a guide to the C programming language.

From Pascal to C: an introduction to the C programming language.

Dr. Dobb's sourcebook: a reference guide to the C programming language.

Complete C language programming for the IBM PC.

The C programming language

C programming language: an applied perspective

Complete C language programming for the IBM

Programming using the C language

Before the searching is performed, stopwords, i.e., words that are not indexed nor used for searching, are removed from the requested title and the retrieved candidates. Such stopwords are: among, all, an, and, are, as, at, be, been, between and the, for example.

If all the words of the request match all the words of the candidate, the closeness value will be high. In the example provided, none of the candidates gets this value. When the evaluation algorithm matches the candidates against the first four characters of each of the words, several candidates have all the words in order. Candidates that match all the words (parts of words) in order with few or no remaining words in the candidate will have a higher closeness value than candidates with more extra words. In this case, therefore, The C programming language is the highest valued candidate which is selected in accordance with step 311. If there are multiple highest value candidates, or the closeness values determined in step 310 are lower than some cutoff, however, all candidates are saved (step 312). Step 313 decides whether there is another query (the next less restrictive query) to perform. If there is, step 309 is executed. If not, (no more queries are available) the candidates and closeness values for the candidates are reported and the process is exited.

There are other fields sometimes provided in the customer's request that can be used to reduce the number of candidates. For example, the publisher might be entered for a book. Although this publisher information is sometimes entered by a customer, it can easily be input incorrectly so its preferred use is for verification or narrowing rather than for primary identification. Also there may be some local identification provided such as the key from the local online catalog.

For illustrating the operation of the database interrogation system in automatically finding the record of an item in a database, the following representative search examples are provided. The input fields have a tag at the start of the line. For book items, "title:" for the title field and "author:" for the author field. For journal items, .jname is the journal name.

In the search string, the ? is used as a truncation operator-that is, all words beginning with the characters up to the ? are retrieved.

Each search query contains afield restriction. This restricts the query so that only the given field is used in retrieving the items. ("/ti" to restrict to the title field and "/au" to restrict to the author field.) The restriction will appear at the end of the search expression for which it applies.

SEARCH 1

Input:
title: Linear Systems: A State Variable Approach With Numnerical Implementation author: Raymond A. DeCarlo
Search Query:
((( linear or lineare or linearen or lineari?) and system? and state? and variable? and approac? and (numerically or numberical or numerical or numnerical) and implementat?)/ti)
Found
.bauthor DeCarlo, Raymond A.,
.btitle Linear systems: a state variable approach with numerical implementation
In this example, the word Numnerical is misspelled.
The search expression constructed for this word is
(numerically or numberical or numerical or numnerical)
The other search expressions are obtained from the search expression database. (Note also in this example that the word numberical, obtained from the trigram database is itself misspelled because the item database has misspellings.)

SEARCH 2

Input:
title: Remembering the Katagana author: Morsbach,Kurebayashi,Heisig
Search Query:
((heisig or morsbach)/au and (remember? and (katakana or katagana))/ti)
Found .bauthor Heisig, James W.
.btitle Remembering The Hiragana: a complete course on how to teach yourself the Japanese syllabary in 3 hours In this example, the word Katagana is not correct. The search expression (katakana or katagana)

is constructed using the spell correction algorithm. It should be noted that the target word in the request is still used in the expression in case the search expression database does not contain all of the item database words.

For the author name search expression, the author search expression database is used and only two of the three names are found, so those are the ones used.

Note also in the closeness evaluation, subtitles, as illustrated by the :a complete course on how to teach yourself the Japanese syllabary in 3 hours on the .btitle line, are considered in the word count matching criteria, since the customer may request an item with or without the subtitle information.

SEARCH 3

Input:
.jname J. Comput. Sys. Sci.
Search Query:
((j or journal)
    and (comput or computability or computacio? or computado? or computat? or compute or compute? or computed or computer? or computi?)
    and (seybold? or statphy? or superall? or survey? or symbiosi? or symmetr? or symposi or symposia or synapse or syndrome? or synerget? or synergi? or synopse? or synopsi? or synthese? or synthesi? or synthet? or syracu? or sys or sysmpos? or syst or syste or system? or systolic)
    and (sci or scie or scien or science? or scienti? or scientometr? or scienza or scienze or scil or scintillat? or sciquest or scission))/ti
Found
.jname Journal of Computer and System Sciences.

It should be noted in this example that words Sys and Sci generate fairly large search expression; a person would not likely use Sys for the word Seybolds ( seybold?). The set retrieved for the term Sys will be larger than really needed, but the extraneous items will be eliminated when added with the other three sets, or later when narrowing down the final retrieved item candidates.

Although the invention has been specifically described, it is obvious that many modifications and variations of the present invention are possible in light of the above teachings. For example, the present invention has application wherever people enter "free form" or unconstrained requests for goods or information. Such is the case in any kind of ordering service where the number of potential items is too large or too varied to support a catalog with stock numbers. It is therefore to be understood that within the scope of the appended claims, the invention may be practiced otherwise than as specifically described.

We claim:

1. A method of retrieving a record for an item in an information database in response to an input string of target words, the method comprising the steps of:
    comparing each word contained in the input string of target words with words contained in a search expression database associated with the information database;
    generating a set of search expressions for each one of multiple ordered queries, each search expression including words from the search expression database for providing an equivalent representation of one or more of the input string of target words;
    retrieving records from the information database, each record retrieved in each of the multiple ordered queries containing the set of search expressions respectively generated for one of the multiple ordered queries, the multiple ordered queries being arranged in order of a most restrictive query to a least restrictive query; and
    selecting in accordance with a predetermined parameter a retrieved one of the records that best matches the input string of target words.

2. The method of claim 1 wherein the words in the search expression database include expanded acronyms and abbreviations that are equivalent to associated words stored in the information database.

3. The method of claim 1 wherein the most restrictive query contains the most search expressions and the least restrictive query contains the fewest search expressions.

4. The method of claim 3 wherein the ordered queries are executed by the executing step for retrieving records from the information database, the executing step including the steps of executing the most restrictive query and, if no records are retrieved, executing the next most restrictive query for retrieving records from the information database.

5. The method of claim 1 wherein the predetermined parameter comprises assigning a closeness value to each record found in accordance with the retrieving step.

6. The method of claim 5 wherein the closeness value assigned to each record is determined by evaluative criteria, said criteria including exact word matching and ordered word prefix matching.

7. The method of claim 6 further comprising the step of comparing the number of matched words and matched word prefixes in each of the retrieved records with said words and word prefixes in the input string of target words.

8. The method of claim 7 wherein the highest closeness value is assigned to the one of the retrieved records having the greater number of matching words and the fewer number of nonmatching words.

9. The method of claim 8 wherein the selecting step further comprises the step of requesting the item corresponding to the retrieved one of the records from an item provider.

10. A method of retrieving a record for an item in an information database in response to an input string of target words, the method comprising the steps of:
    comparing each word contained in the input string of target words with words contained in a first search expression database associated with the information database;
    generating a plurality of search expressions, each search expression including a word from the string of target words and words from the search expression database for providing art equivalent representation of one or more of the input string of target words, and one or more selected words close in character content to one of the target words not located in the first search expression database, the one or more selected words being obtained from a second search expression database for supplementing said target word;

retrieving records from the information database, each record containing the words included in each of the search expressions; and selecting in accordance with a predetermined parameter a retrieved one of the records that best matches the input string of target words.

11. The method of claim 10 wherein the second search expression data base comprises a trigram database, the trigram database containing words that are close in character content to mispelled target words.

12. The method of claim 11 wherein the predetermined parameter comprises assigning a closeness value to each record found in accordance with the retrieving step.

13. The method of claim 12 wherein the closeness value assigned to each record is determined by evaluative criteria, said criteria including exact word matching and ordered word prefix matching.

14. The method of claim 13 further comprising comparing the number of matched words and matched word prefixes in each of the retrieved records with said words and word prefixes in the input string of target words.

15. The method of claim 14 wherein the highest closeness value is assigned to the one of the retrieved records having the greater number of matching words and the fewer number of nonmatching words.

16. The method of claim 10 wherein the selecting step further comprises the step of requesting the item corresponding to the retrieved one of the records from an item provider.

17. A method of retrieving a record of an item from a plurality of information databases in response to a series of input words, the method comprising the steps of:

comparing each word contained in the series of input words with words contained in a first and a second one of a plurality of search expression databases associated with a first one of the plurality of information databases;

generating a set of search expressions, each search expression in the set including words from the first search expression database for providing an equivalent representation of one or more of the series of input words and words from the second search expression database for providing selected words close in character content to one or more of the series of input words;

searching in the first one of the plurality of information databases for retrieving records containing the search expressions;

searching in other of the plurality of information databases for retrieving records containing the search expressions when none of the retrieved records in the first one of the plurality of information databases best matches the series of input words in accordance with a predetermined parameter; and selecting in accordance with the predetermined parameter the retrieved record from any of the plurality of information databases that best matches the series of input words.

18. The method of claim 17 wherein the searching in other of the plurality of information databases is performed in a predetermined order.

19. The method of claim 17 wherein the predetermined parameter comprises assigning a closeness value to each record found in accordance with the retrieving step.

20. The method of claim 19 wherein the closeness value assigned to each record is determined by evaluative criteria, said criteria including exact word matching and ordered word prefix matching.

21. The method of claim 20 wherein the closeness value assigned to each record is further determined by the step of comparing the number of matched words and matched word prefixes in each of the retrieved records with said words and word prefixes in the series of input words.

22. The method of claim 21 wherein the highest closeness value is assigned to the one of the retrieved records having the greater number of matching words and matching prefixes and the fewer number of nonmatching words.

23. A system for retrieving a record of an item in an information database in response to an input string of target words, the system comprising:

means for comparing each word contained in the input string of target words with words contained in a search expression database associated with the information database;

means for generating a set of search expressions for each one of multiple ordered queries, each search expression including words from the search expression database for providing an equivalent representation of one or more of the input string of target words;

means for retrieving records from the information database, each record retrieved in each of the multiple ordered queries containing the set of search expressions respectively generated for one of the multiple ordered queries, the multiple ordered queries being arranged in order of a most restrictive query to a least restrictive query; and means for selecting in accordance with a predetermined parameter a retrieved one of the records that best matches the input string of target words.

24. The system of claim 23 wherein the words in the search expression database include expanded acronyms and abbreviations that are equivalent to associated words stored in the information database.

25. The system of claim 23 wherein the predetermined parameter comprises a closeness value indicator assigned to each record retrieved in the information database.

26. The system of claim 25 wherein the closeness value indicator assigned to each record is determined by evaluative criteria, said criteria including exact word matching and ordered word prefix matching.

27. The system of claim 25 further comprising means for comparing the number of matched words and matched word prefixes in each of the retrieved records with said words and word prefixes in the input string of target words.

28. The system of claim 25 wherein the highest closeness value indicator is assigned to the one of the retrieved records having the greater number of matching words and the fewer number of nonmatching words.

* * * * *